US012110715B2

(12) United States Patent
Bergum et al.

(10) Patent No.: US 12,110,715 B2
(45) Date of Patent: Oct. 8, 2024

(54) STORAGE BOX LATCH SYSTEM AND SECURITY FEATURES

(71) Applicant: WERNER CO., Greenville, PA (US)

(72) Inventors: Robert A. Bergum, Woodstock, IL (US); Kenneth Dombrowski, Evanston, IL (US); Michael Gong, Elk Grove Village, IL (US); Thomas W. Parker, Jamestown, PA (US)

(73) Assignee: WERNER CO., West Middlesex, PA (US)

(*) Notice: Subject to any disclaimer, the term of this patent is extended or adjusted under 35 U.S.C. 154(b) by 284 days.

(21) Appl. No.: 17/350,661

(22) Filed: Jun. 17, 2021

(65) Prior Publication Data

US 2022/0403682 A1 Dec. 22, 2022

(51) Int. Cl.
*E05B 67/38* (2006.01)
*E05B 17/00* (2006.01)
(Continued)

(52) U.S. Cl.
CPC .......... *E05B 67/383* (2013.01); *E05B 17/002* (2013.01); *E05C 9/025* (2013.01);
(Continued)

(58) Field of Classification Search
CPC .. E05B 67/383; E05B 67/38; E05B 2067/386; E05B 65/44; E05B 65/52; E05B 65/5207; E05B 65/5215; E05B 65/523; E05B 65/5238; E05B 65/5284; E05B 65/025; E05B 65/02; E05B 63/24;
(Continued)

(56) References Cited

U.S. PATENT DOCUMENTS 2,825,218 A 3/1958 O'Brien
2,974,987 A 3/1961 O'Brien
(Continued)

FOREIGN PATENT DOCUMENTS

CA 2140855 A 2/1994
CA 2427853 C 4/2007
(Continued)

*Primary Examiner* — Christine M Mills
*Assistant Examiner* — Yahya Sidky
(74) *Attorney, Agent, or Firm* — MCDONNELL BOEHNEN HULBERT & BERGHOFF LLP

(57) ABSTRACT

A latch assembly for use in a storage container is provided, and comprises a bracket having a body, a first side, and a second side, the bracket being releasably secured to the first or the second body component of the storage container. The first side includes a protruding segment. The body includes at least one slot positioned thereon, the bracket being secured to the storage container via a fastener inserted through the at least one slot. The latch assembly also includes a handle secured to the bracket. When the handle is moved in a first direction, the bracket moves from a latched position to an unlatched position where the protruding segment passes through a lock box assembly, and when the handle is moved in a second direction, the bracket moves from an unlatched position to a latched position where the lock box assembly blocks movement of the protruding segment. The latch assembly is used in conjunction with a lock system.

20 Claims, 11 Drawing Sheets

(51) Int. Cl.
*E05C 9/02* (2006.01)
*E05C 9/18* (2006.01)
*E05G 1/04* (2006.01)

(52) U.S. Cl.
CPC ................ *E05C 9/185* (2013.01); *E05G 1/04* (2013.01); *E05Y 2999/00* (2024.05)

(58) Field of Classification Search
CPC .. E05B 63/244; E05B 63/0052; E05B 17/002; E05C 9/02; E05C 9/025; E05C 9/18; E05C 9/1825; E05C 9/1833; E05C 9/185; E05C 2009/1866; B65D 43/22; B65D 55/14
USPC ................................. 220/243, 244, 324, 833
See application file for complete search history.

(56) References Cited

U.S. PATENT DOCUMENTS

| | | | | |
|---|---|---|---|---|
| 3,334,933 | A | 8/1967 | Ehlers | |
| 3,572,062 | A | 3/1971 | Beebe | |
| 3,606,423 | A | 9/1971 | McCarthy | |
| 3,727,438 | A | 4/1973 | Knaack | |
| 3,808,847 | A | 5/1974 | Vesely | |
| 3,981,524 | A | 9/1976 | Gutridge et al. | |
| 4,068,505 | A | 1/1978 | Volk, Jr. | |
| 4,135,375 | A | 1/1979 | Voegeli | |
| 4,185,860 | A | 1/1980 | Bondi | |
| 1,290,281 | A | 9/1981 | Knaack et al. | |
| 4,369,993 | A | 1/1983 | Rodriguez | |
| 4,613,175 | A | 9/1986 | Nelson | |
| 4,718,259 | A | 1/1988 | Appelbaum | |
| 4,742,701 | A | 5/1988 | Scavetto | |
| 4,802,351 | A | 2/1989 | Kojak | |
| 4,841,756 | A | 6/1989 | Curtis | |
| 4,883,294 | A | 11/1989 | Goodspeed | |
| 4,932,692 | A | 6/1990 | Nelson | |
| 4,977,763 | A | 12/1990 | Sewell | |
| 5,076,078 | A | 12/1991 | Weger, Jr. | |
| 5,172,097 | A | 12/1992 | Arnold | |
| 5,235,830 | A | 8/1993 | Benge et al. | |
| 5,308,126 | A | 5/1994 | Weger, Jr. et al. | |
| 5,410,893 | A | 5/1995 | Easterwood | |
| 5,641,017 | A | 6/1997 | Drake | |
| 5,988,473 | A | 11/1999 | Hagan et al. | |
| 6,058,745 | A | 5/2000 | Sanchez | |
| 6,065,314 | A | 5/2000 | Nicholson | |
| 6,351,975 | B1 | 3/2002 | Valdes | |
| 6,494,064 | B1 | 12/2002 | Pena | |
| 6,681,604 | B1 | 1/2004 | Samsel | |
| 6,772,613 | B2 | 8/2004 | Webb et al. | |
| 7,318,632 | B2 | 1/2008 | Bidinger et al. | |
| 7,370,890 | B2 | 5/2008 | Samsel | |
| 7,823,741 | B2 | 11/2010 | Bridges et al. | |
| 7,997,630 | B2 | 8/2011 | Lemley et al. | |
| 8,096,152 | B2 | 1/2012 | Wagh et al. | |
| 8,245,546 | B2 | 8/2012 | Olsson | |
| 8,342,580 | B2 | 1/2013 | Cowie et al. | |
| RE44,387 | E | 7/2013 | Bridges et al. | |
| 8,601,838 | B2 | 12/2013 | Hansen et al. | |
| 8,684,421 | B2 | 4/2014 | Cowie et al. | |
| 8,740,319 | B1 | 6/2014 | Davis et al. | |
| 9,272,820 | B2 | 3/2016 | Cowie | |
| 9,663,278 | B1 | 5/2017 | Daws, II | |
| 9,797,167 | B2 | 10/2017 | Schuling et al. | |
| 9,926,726 | B1 | 3/2018 | Santosa | |
| 10,081,467 | B2 | 9/2018 | Daws, II et al. | |
| 10,337,220 | B2 | 7/2019 | Bowles | |
| 2002/0108410 | A1 | 8/2002 | Webb et al. | |
| 2005/0103065 | A1 | 5/2005 | Dennis | |
| 2006/0230795 | A1* | 10/2006 | Kroening | E05C 9/08 70/159 |
| 2008/0110893 | A1* | 5/2008 | Cowie | E05C 9/02 70/52 |
| 2008/0223091 | A1 | 9/2008 | Kroening et al. | |
| 2012/0104012 | A1 | 5/2012 | Cowie et al. | |
| 2014/0291325 | A1 | 10/2014 | Cowie et al. | |
| 2015/0121974 | A1* | 5/2015 | Schuling | B25H 3/02 70/63 |
| 2018/0044946 | A1* | 2/2018 | Horton | E05B 67/00 |
| 2020/0324943 | A1* | 10/2020 | Mattila | B65D 43/22 |
| 2021/0010298 | A1* | 1/2021 | Derman | E05B 67/38 |
| 2021/0230909 | A1* | 7/2021 | Van Niekerk | E05B 67/38 |

FOREIGN PATENT DOCUMENTS

| | | | |
|---|---|---|---|
| CA | 2572640 | C | 10/2009 |
| CA | 2752853 | C | 6/2013 |
| CA | 2830421 | C | 11/2015 |
| CA | 2756360 | C | 12/2015 |
| CA | 2756365 | C | 9/2017 |
| MX | 2011007141 | A | 7/2011 |
| MX | 336643 | B | 1/2016 |

* cited by examiner

STORAGE BOX LATCH SYSTEM AND SECURITY FEATURES

BACKGROUND

1. Field

The present disclosure relates generally to a storage box latch system and security features, and more particularly to a latch system that does not invade the storage area of the storage box, is removable, and also prevents tampering.

2. Description of the Related Art

Containers, such as storage boxes, tool boxes, and storage cabinets, which are used at construction job sites and similar locations for storing tools and materials, are typically protected from theft by latches and/or locks. Some containers have lock systems that shield the lock so that the lock will not be exposed to tampering, such as via attempts to cut the lock or pry open the lock body.

Various locking systems have been proposed for both horizontally disposed locking boxes having an upwardly opening lid, as well as vertically disposed locking boxes having vertical doors. Many of these systems are large and cumbersome, and take up valuable space inside the box. Additionally, known systems are welded to the inside of the storage box so they cannot be removed. Further, known locking systems do not include means to prevent tampering with the hinge of the box.

SUMMARY

In one embodiment, the present disclosure provides a latch assembly for use in a storage container having a first body component and a second body component. The latch assembly comprises a bracket having a body, a first side, and a second side, the bracket being releasably secured to the first or the second body component of the storage container. The first side includes a protruding segment. The body includes at least one slot positioned thereon, the bracket being secured to the storage container via a fastener inserted through the at least one slot. The latch assembly also includes a handle secured to the bracket. When the handle is moved in a first direction, the bracket moves from a latched position to an unlatched position where the protruding segment passes through a lock box assembly, and when the handle is moved in a second direction, the bracket moves from an unlatched position to a latched position where the lock box assembly blocks movement of the protruding segment.

In another embodiment, a latch system for use in a storage container having a first body component and a second body component is provided. The latch system comprises a latch assembly including a bracket having a body, a first side, and a second side, the bracket being releasably secured to the first body component or the second body component of the storage container. The first side includes a protruding segment. The body includes at least one slot positioned on the body of the bracket, and the bracket is secured to the storage container via a fastener inserted through the at least one slot. The latch assembly also includes a handle secured to the bracket. The latch system further comprises a lock box assembly positioned on the storage container, the lock box assembly including a housing and a lock positioned within the housing. When the lock is unlocked and the handle is moved in a first direction, the bracket moves from a latched position to an unlatched position where the protruding segment passes through the housing, and when the handle is moved in a second direction and the lock is locked, the bracket moves from an unlatched position to a latched position where the lock blocks movement of the protruding segment through the housing.

In yet another embodiment, a storage container having a latch system includes a body and a lid mounted on the body by a hinge, a latch assembly releasably secured to an interior of the body, and a lock box assembly. The latch assembly includes a bracket having a body, a first side, and a second side. The first side includes a protruding segment. The body includes at least one slot positioned thereon, and the bracket is secured to the interior of the body of the storage container via a fastener inserted through the at least one slot. The latch assembly also includes a handle secured to the bracket. The latch system also comprises a lock box assembly mounted to the interior of the body of the storage container, the lock box assembly including a housing and a lock positioned within the housing. When the lock is unlocked and the handle is moved in a first direction, the bracket moves from a latched position to an unlatched position where the protruding segment passes through the housing, and when the handle is moved in a second direction and the lock is locked, the bracket moves from an unlatched position to a latched position where the lock blocks movement of the protruding segment through the housing.

BRIEF DESCRIPTION OF THE FIGURES

Exemplary embodiments of the disclosure are described herein with reference to the drawings, in which.

DETAILED DESCRIPTION

The present disclosure provides a latch system and assembly for a jobsite storage box or tool box, which affords protection against tampering. The storage box also includes security features to prevent attempted forced entry in the rear of the box.

Figure 1:
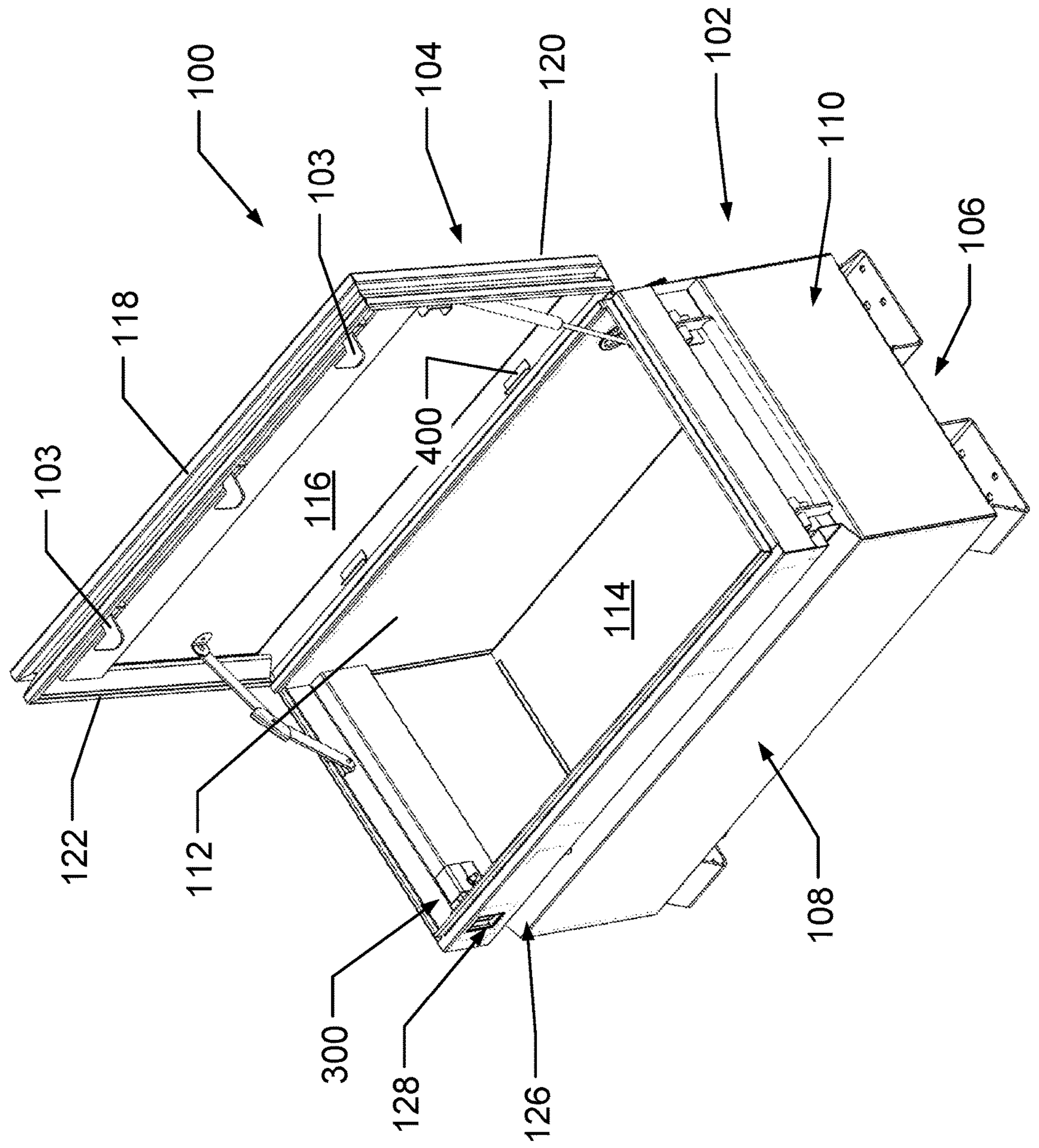
FIG. 1 is a front perspective view of a storage box incorporating a latch assembly and a lock system according to an embodiment of the disclosure.
Figure 2:
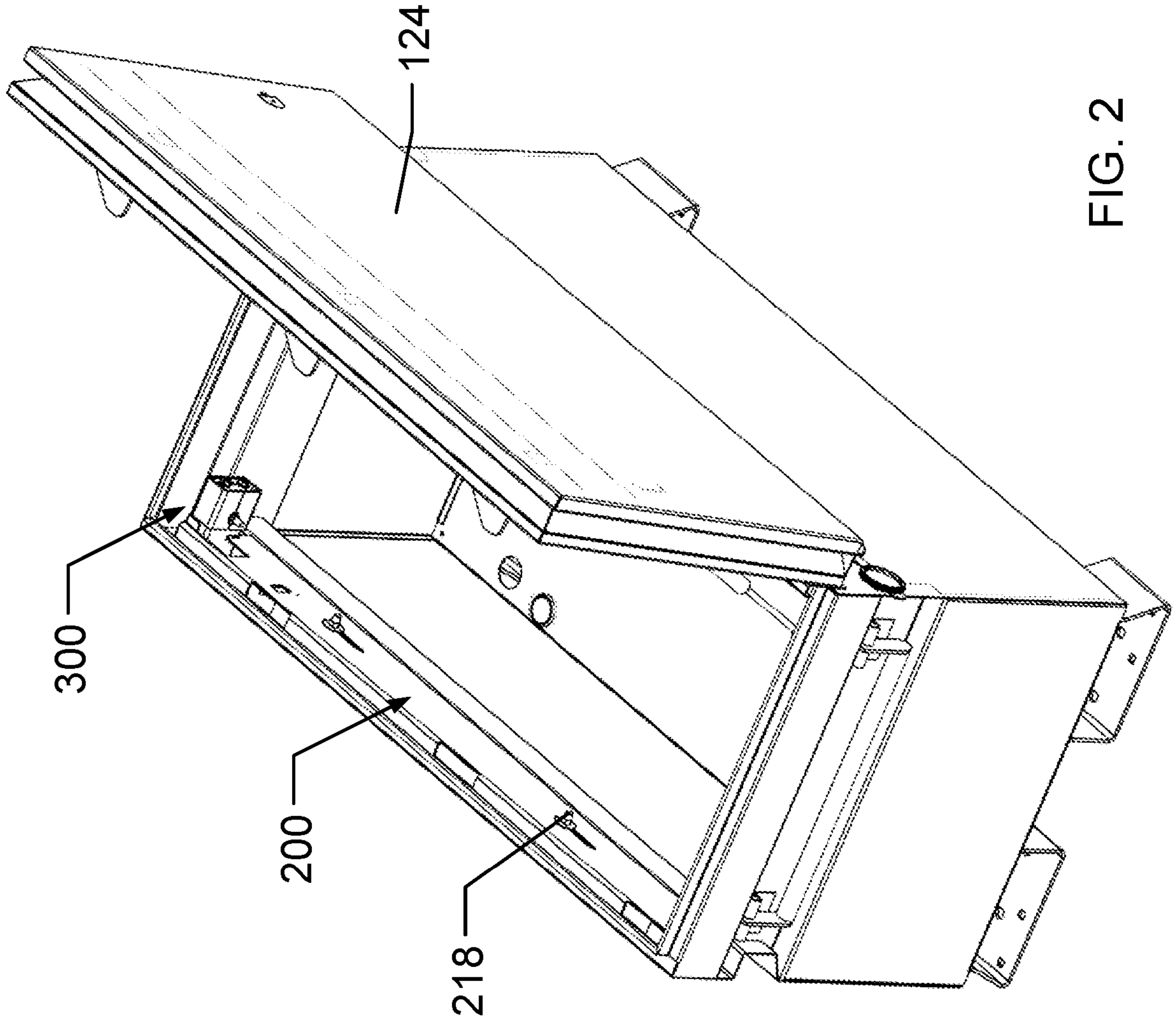
FIG. 2 is a rear perspective view of the box shown in FIG. 1.
Figures 3A, 3B, 3C:
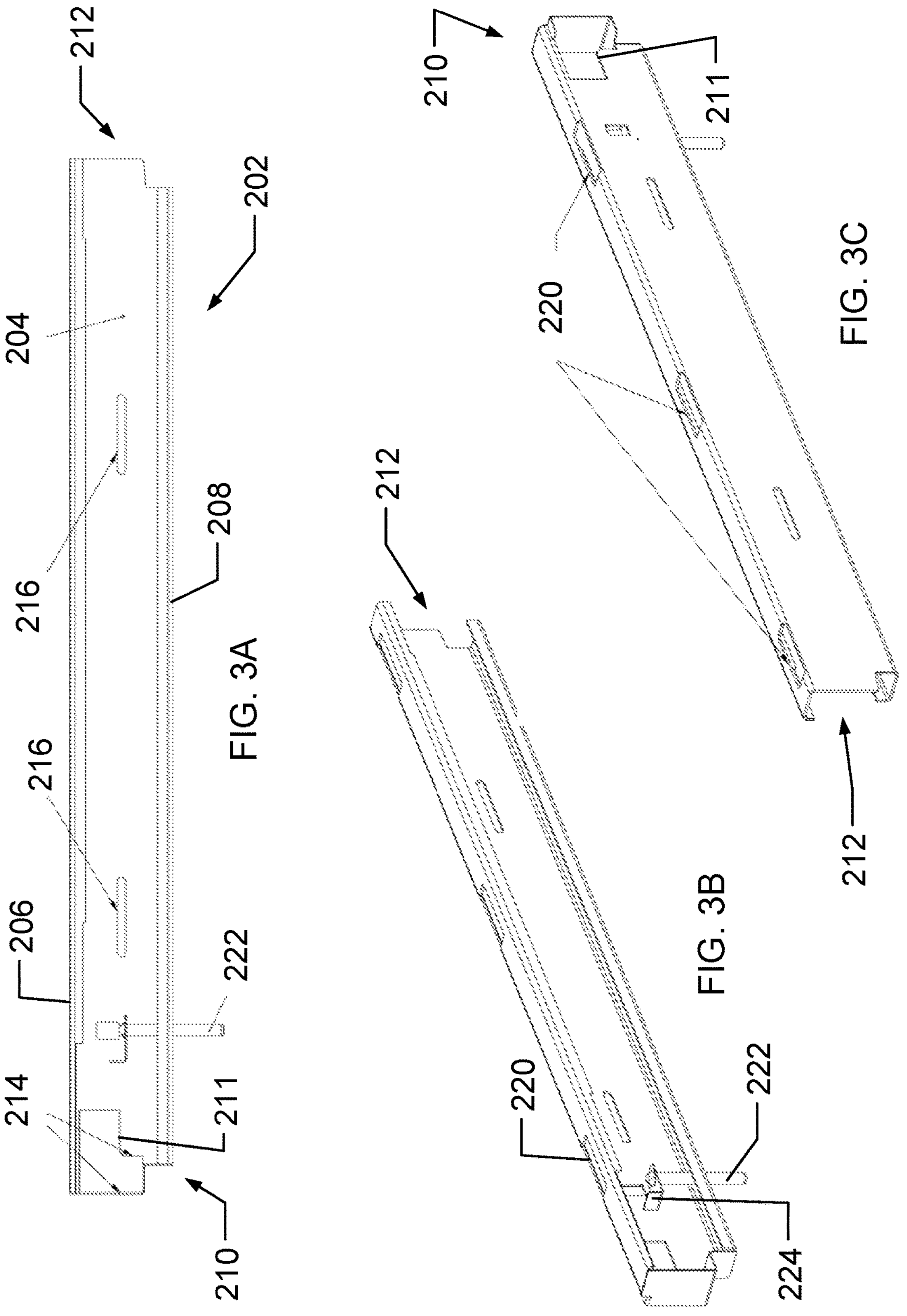
FIG. 3A is a front view of the latch assembly shown in FIG. 1.
FIG. 3B is a perspective front view of the latch assembly shown in FIG. 3A.
FIG. 3C is a perspective rear view of the latch assembly shown in FIG. 3A.

Turning now to the drawings, FIGS. 1 and 2 show a jobsite storage box 100, including a latch assembly 200 (shown in detail in FIGS. 3A-3C). It should be understood that the latch assembly 200 may be used with a horizontal or vertical storage box, storage cabinet, or tool box.

The storage box 100 has a conventional look, with body 102 and lid 104 in the illustrated embodiment. While this description will refer to the body 102 and lid 104 as the first and second components, respectively, it will be appreciated by those skilled in the art that the location of various elements may be disposed along either the first or the second body components, i.e., the lid might alternately be identified as the first body component and the body identified as the second body component.

As illustrated, the body 102 comprises a bottom 106, a front wall 108, side walls 110, and a rear wall 112, which together define an enclosed space 114. Similarly, the lid 104 includes a top portion 116, and may include a front wall 118, side walls 120, 122, and a back wall 124. The body 102 and lid 104 are hingeably coupled along the back wall 124 by hinge 150 (shown in FIG. 9C), such that they are movable between the open position illustrated in FIGS. 1 and 2, and a closed position (shown in FIG. 8), further defining the enclosed space 114. In some embodiments, the box 100 may be alternately constructed, for example, the box may be open along the top and a portion of the front wall, and may include a bi-fold lid which covers the top and the open portion of the front wall of the box.

In order to lock the storage box 100 to prevent theft when the box 100 is in its closed position, a latch assembly 200 is provided. The latch assembly 200 is intended to be used in conjunction with a lock system 300 (together, a latch system) to lock and unlock the box 100. The latch assembly 200 includes a bracket 202 positioned along the front wall 108 of the box 100. The bracket 202 is configured to slide laterally between an unlatched position and a latched position. The bracket 202, shown in FIGS. 3A-3C, has a generally slim profile, so as not to intrude on the storage space in the enclosed space 114. In some embodiments, the bracket 202 has a thickness of about 1.5 in. to about 1.8 in. The bracket 202 includes a generally planar body 204, a top ledge 206, and a bottom ledge 208, which each extend toward the enclosed space 114 in a direction generally perpendicular to the body 204. The bracket 202 further includes a first side 210 and a second side 212. First side 210 includes a protruding segment 211 and one or more padlock contact areas 214 in which portions of a lock housing of the lock system 300 is positioned, as will be described in detail below.

The body 204 further includes one or more slots 216 through which a bolt 218 or other similar fastener can be inserted, to secure the bracket 202 to the box 100. As shown in FIGS. 3A-3C, the body 204 includes two slots 216. In other embodiments additional slots may be included. The use of bolts and slots (or other similar fasteners and slots) allows the latch assembly 200 to be removeable, which facilitates maintenance and repair, or allows for replacement of the latch assembly 200. In some embodiments, the latch assembly may be secured to the box in such a way that it is not removeable.

In some embodiments, the top ledge 206 of the body 204 includes one or more lid hook slots 220. As shown in FIGS. 3A-3C, the top ledge 206 includes three lid hook slots 220. In other embodiments, more or less lid hook slots may be included. The lid hook slots 220 interact with corresponding lid hooks 103 attached to the lid 104, as will be described in further detail below.

To facilitate lateral movement of the bracket 202 within the box 100, the bracket 202 includes a handle 222, which may be secured to the bracket 202 by a support 224, and is accessible to a user from the outside of the box 100, as shown in FIG. 1. It should be understood that the handle 222 may be of any appropriate form, such as a rod or knob, or any other structure suitable for a user to grasp to move the bracket 202 to lock and unlock the box 100. To minimize opportunity for damage to the handle 222, the handle 222 preferably extends generally downward from the bracket 202 and through an elongated slot in the upper wall of an external recessed portion 126 of the front wall 108 of the box 100. While the handle 222 is illustrated as disposed near the lock box assembly 302, it could alternatively be disposed anywhere along the recessed portion 106 of the box 100 to facilitate access by a user.

Figure 4:
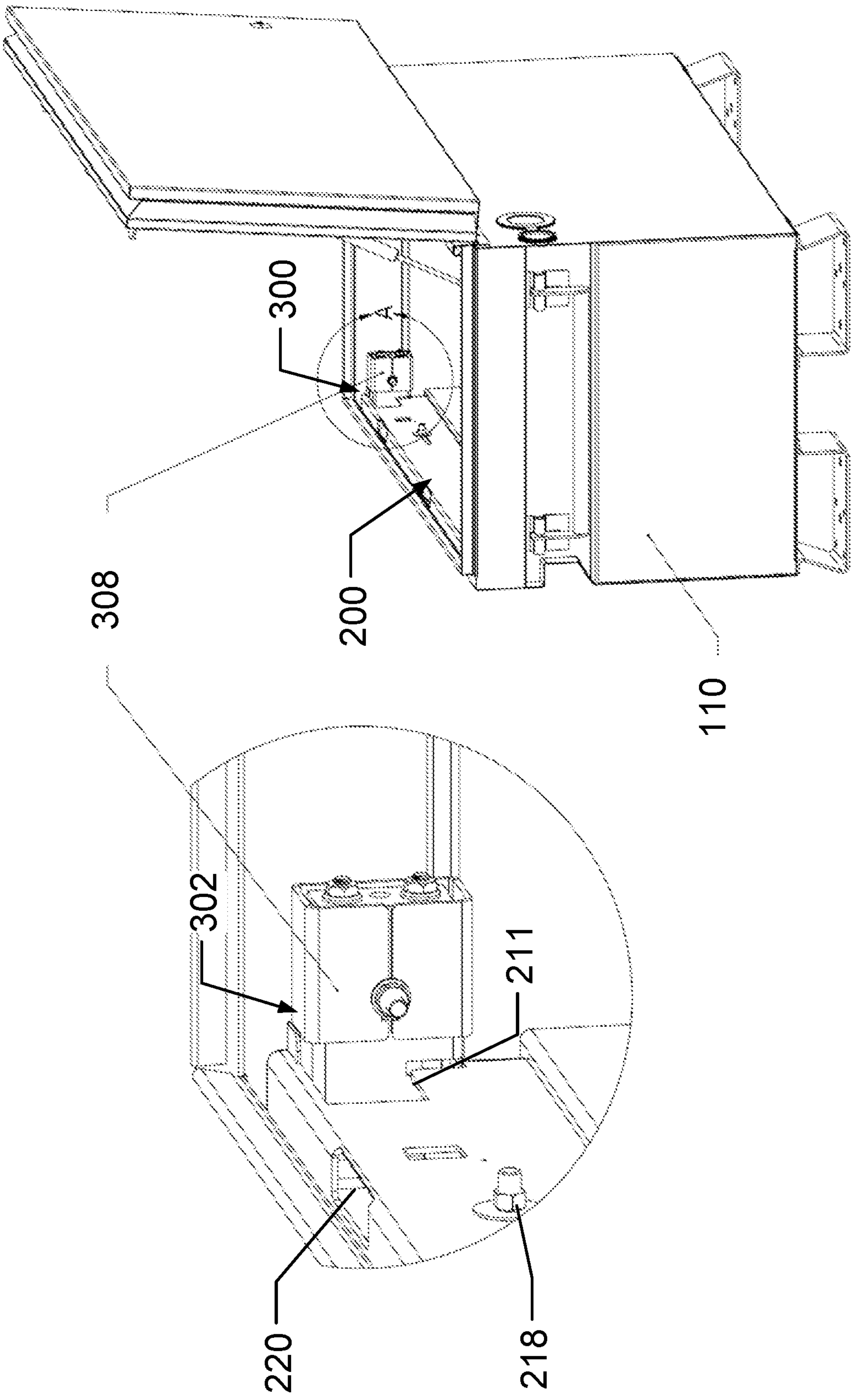
FIG. 4 is a view showing the lock system positioned within the storage box.
Figure 5C:
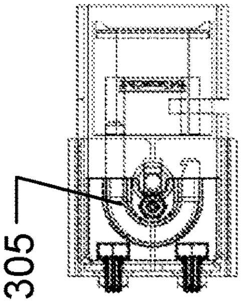
FIG. 5C is a cross-sectional view of the lock box assembly of FIG. 5A including a lock.
Figure 5B:
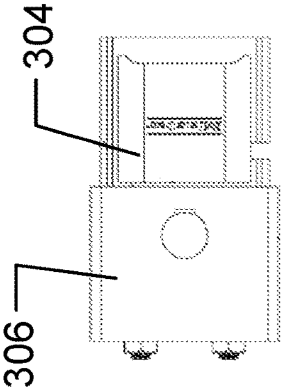
FIG. 5B is a rear view of the lock box assembly shown in FIG. 5A.
Figure 5A:
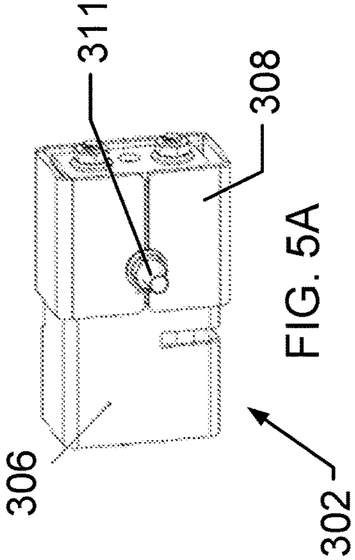
FIG. 5A is a front view of a lock box assembly of the lock system shown FIG. 4.
Figure 5D:
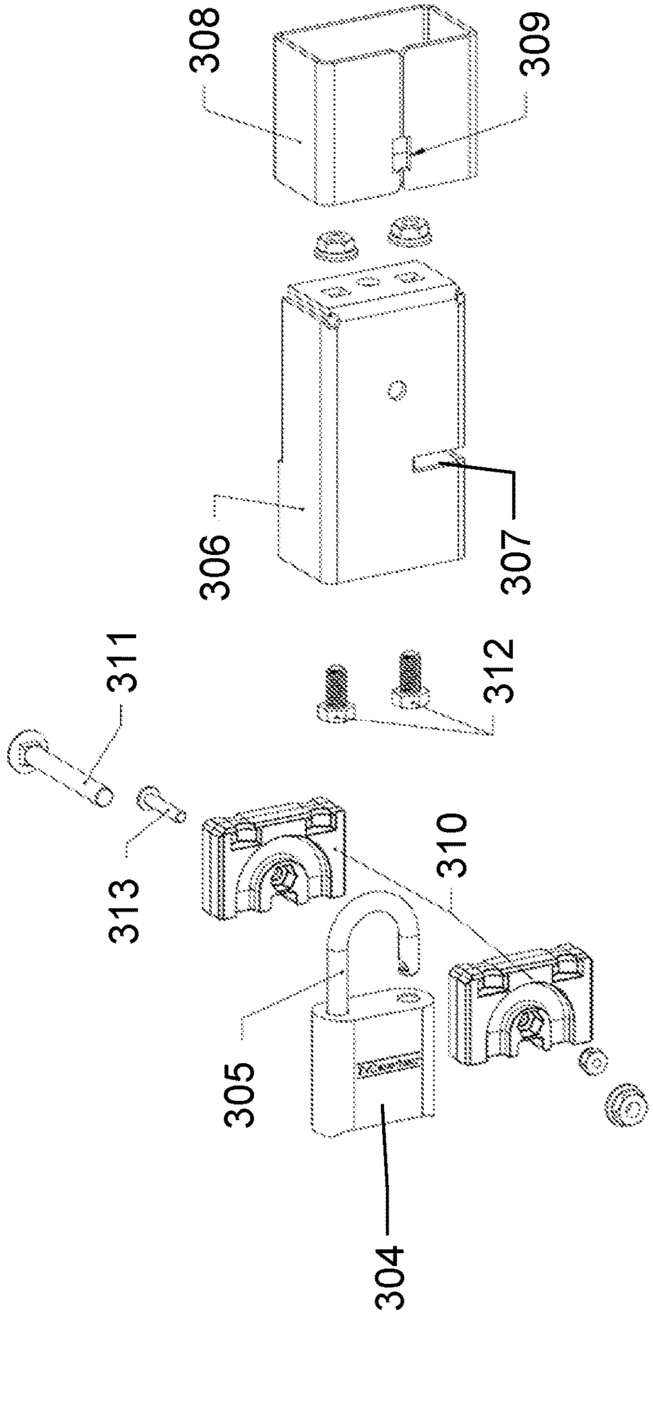
FIG. 5D is an exploded view of the lock box assembly of FIG. 5A.

As mentioned above, the bracket 202 is configured to slide laterally between an unlatched position and a latched position where the protruding segment 211 is disengaged or engaged, respectively, from a lock system 300 extending from the inside of the lid 104 into the box 100, as shown in FIGS. 4 and 5A-5D. In some embodiments, the lock system 300 includes a lock box assembly 302 surrounding a lock, which may be a conventional padlock 304 having a padlock body with a key insertion surface on the bottom (not shown), and a shackle 305, as shown in FIGS. 5C and 5D.

As is conventional, the shackle 305 and padlock body 304 are movable relative to one another between locked and unlocked positions. The lock box assembly 302 may be secured to the front wall 108 of the box 100 by any appropriate method, such as welding or the like.

The padlock 304 is provided within the lock box assembly 302, which includes a lock housing 306, a cover 308, and shackle blocks 310. FIG. 4 shows the padlock 304 being disposed in a horizontal orientation within the lock housing 306. In this orientation, the key insertion surface is accessible via an opening 128 in the storage box 100, shown in FIG. 1. Although the lock housing 306 is shown as a having five walls, it will be appreciated that the lock housing 306 may have more or less walls.

Figure 7B:
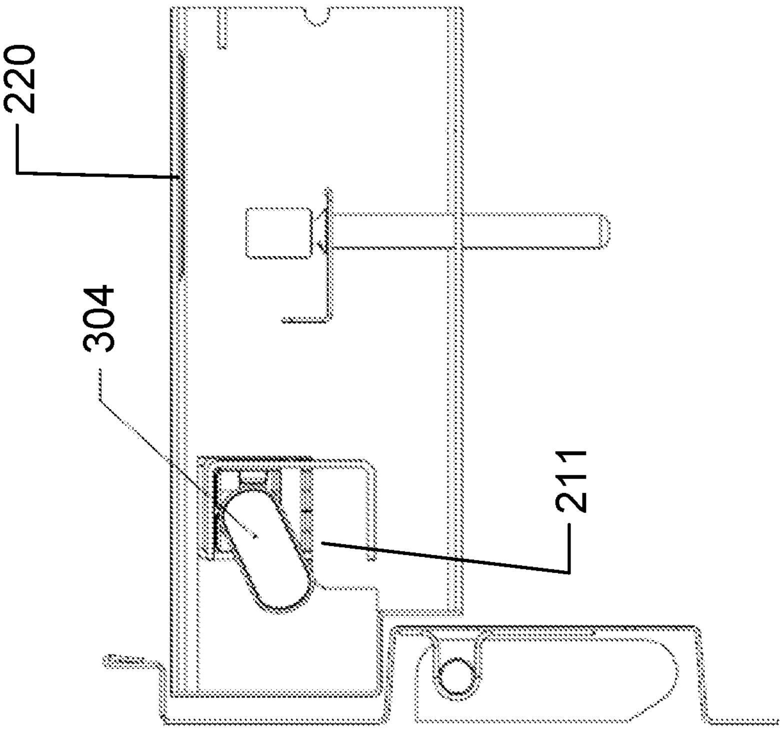
FIG. 7B is a front view of a lock in the unlocked position and a latch assembly in the unlatched position.
Figure 7A:
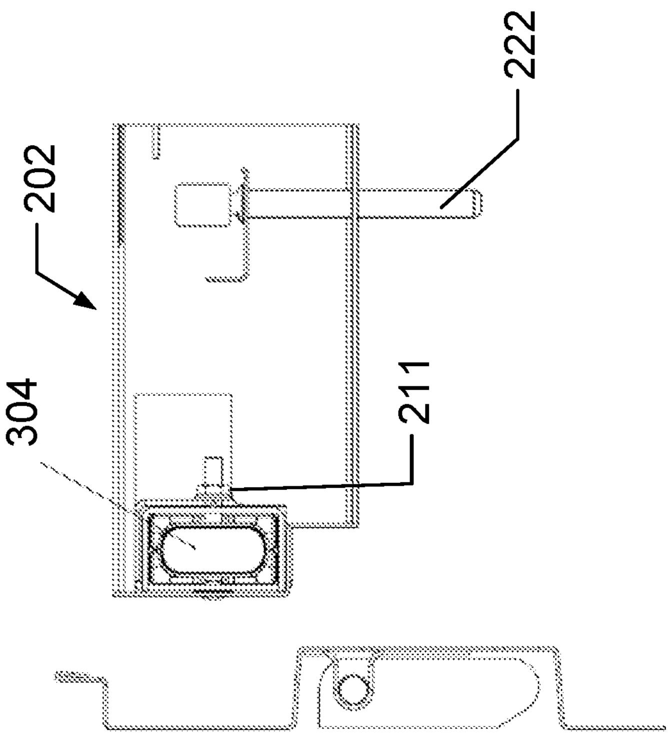
FIG. 7A is a front view of a lock in the locked position and a latch assembly in the latched position.

The lock housing 306 is positioned between the padlock contact areas 214 of the bracket 202 in the locked position, as shown in FIG. 7A. The lock housing 306 further includes a slot 307 for engagement by the protruding segment 211 of the bracket 202. The bracket 202 is disposed relative to the lock housing 306 such that when the storage box lid 104 is in the closed position and the bracket 202 is in the latched position illustrated in FIG. 7A, the padlock body of the locked padlock 304 blocks the lateral movement of the bracket 202 to prevent the bracket 202 from moving into the unlatched position. Conversely, when the padlock 304 is in the unlocked position, as is illustrated in FIG. 7B, the padlock body no longer blocks the lateral movement of the bracket 202. More specifically, when the padlock 304 is in the unlocked position shown in FIG. 7B, the protruding segment 211 is free to advance through the slot 307 of the lock housing 306 and past the padlock 304. The rotation of the padlock 304 allows the bracket 202 to move. In this way, when the padlock 304 is unlocked, the bracket 202 is free to be moved into the unlatched position, thereby allowing the lid 104 to be moved to an open position. Conversely, when the padlock 304 is in the locked position, as shown in FIG. 7A, the protruding segment 211 enters slot 307 of the lock housing 306, but then abuts the body of the padlock 304 to prevent lateral movement of the bracket 202. In this position, the lid 104 of the box 100 cannot be moved to an open position.

The cover 308 provides further support to the padlock 304, and is preferably coupled to the lock housing 306 through a slot 309 by at least one fastener 311, in this case a nut and bolt. The slot 309 in the cover 308 permits the position of the cover to be adjusted. The adjustable cover 308 permits padlocks 304 with either long or short shackles to be used.

Figure 6B:
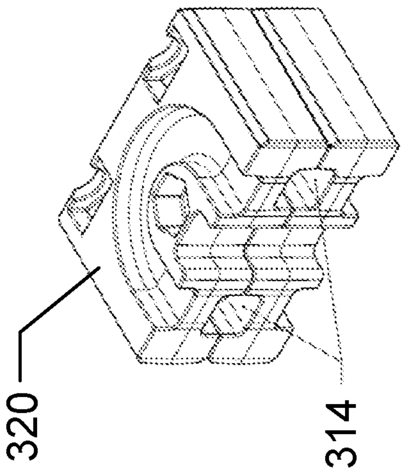
FIGS. 6A, 6B, and 6C are views showing various shackle blocks that can be used with a lock box assembly, such as the lock box assembly of FIG. 5A.
Figure 6C:
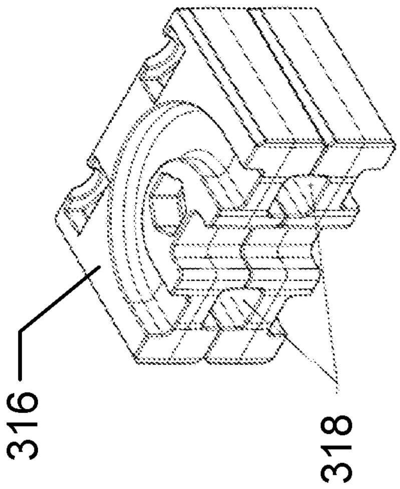
Figure 6A:
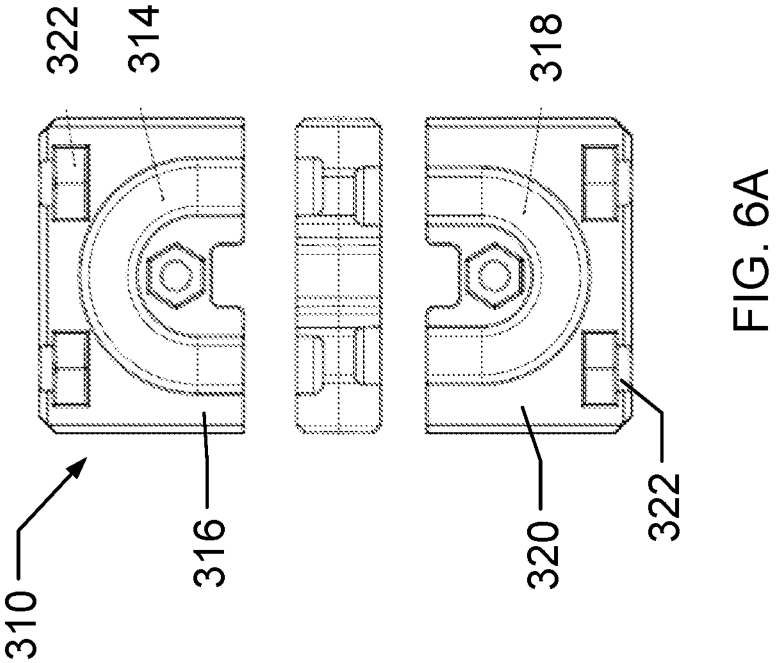

Additionally, in some embodiments, the lock box assembly 302 includes one or more shackle blocks 310 mounted therein for accommodating padlocks having different sized radii. The shackle blocks 310 are held within the lock housing 306 by shackle block retainer bolts 312. Referring to FIG. 6A, a first groove 314 on a first side 316 of the shackle block 310 is sized to fit a padlock shackle which has a large radius, while a second groove 318 on a second, opposite side 320 is sized to fit a padlock shackle which has a small radius. A plurality of recesses 322 in the shackle blocks 310 serve to capture the heads of the shackle block retainer bolts 312. FIGS. 6B and 6C show a pair of shackle blocks 310 sandwiched together two different ways in order to retain a padlock 340 having either a large (FIG. 6B) or a small (FIG. 6C) radius shackle. As shown in FIG. 6B, the first sides 316 of the pair of shackle blocks 310 are secured together so the first grooves 314 line up to form a passage or channel to accommodate a large radius shackle. A large radius shackle may have an internal radius of about 0.450 inches, for example. As shown in FIG. 6C, the second sides 320 of the pair of shackle blocks 310 are secured together so the second grooves 316 line up to form a passage or channel to accommodate a small radius shackle. A small radius shackle may have an internal radius of about 0.375 inches, for example. In some embodiments, the pair of shackle blocks 310 may be secured together by one or more shackle block assembly screws 313, as shown in FIG. 5D. A user may therefore customize the lock box assembly 302 by choosing which side of the shackle block 310 to use. Thus, both the cover 308 and the grooved shackle blocks 310 permit padlocks with long or short shackles and shackles with large or small radii to be used.

In an alternate embodiment, the shackle blocks 310 may be replaced with a shackle bracket formed as a j-shaped bracket (not shown) having a plurality of holes for accommodating different sized padlock shackles.

Figure 8:
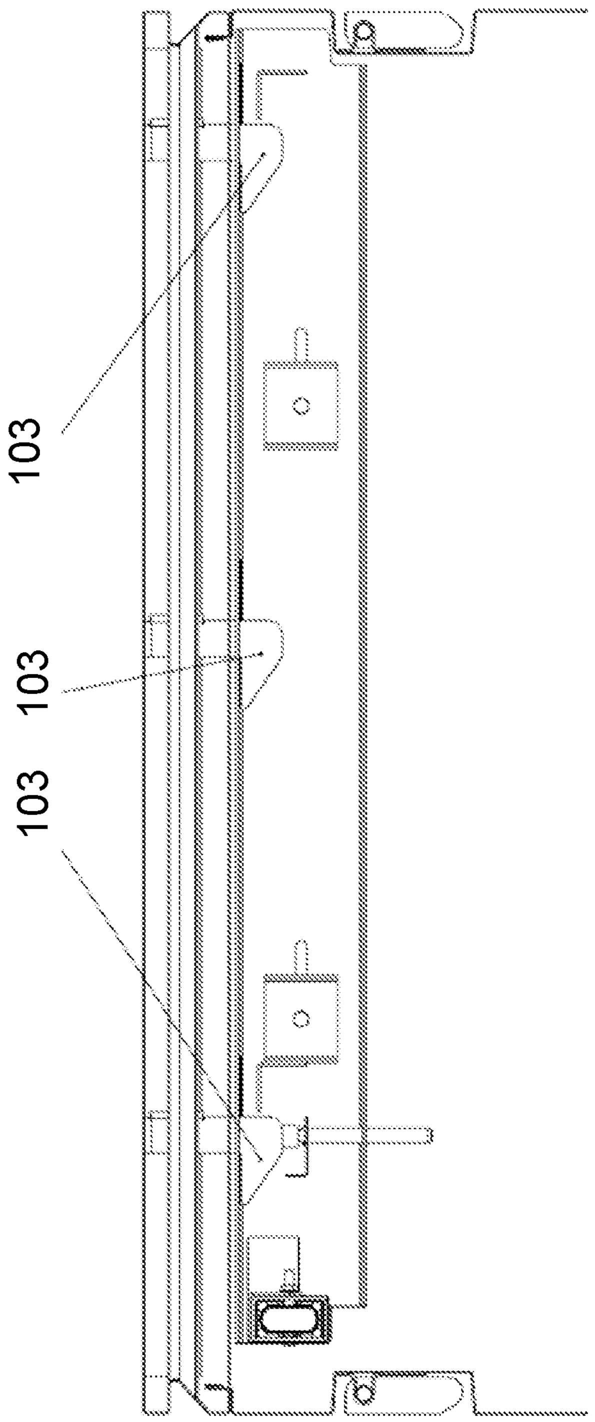
FIG. 8 is a front view of the storage box shown in FIG. 1 in the locked and latched position.

Referring now to FIG. 8, one or more lid hooks 103 are secured to the front wall 118 of the lid 104, such as by welding. The lid hooks 103 engage the lid hook slots 220 on the bracket 202. When the lid 104 is fully closed and the bracket 200 is in the latched position, the lid hooks 103 stay to one side of the lid hook slots 220, thereby preventing the lid 104 from being opened. When the lid 104 is closed and the bracket 202 is in the unlatched position, the lid hooks 103 align with the lid hook slots 220, which allows the lid hooks 103 to pass through the lid hook slots 220 and the lid 104 to open. Although three lid hooks 103 and lid hook slots 220 are shown, it should be understood that more or less lid hooks and lid hook slots could be present.

In operation, when the storage box 100 is closed and locked, a user unlocks the padlock 304 to the unlocked position using a key (not shown). The handle 222 is then free to slide laterally within the recessed portion 126 between the latched and unlatched positions. When the handle 222 is moved in a first direction, such as toward the padlock 304, the protruding segment 211 passes through the slot 307 of the lock housing 306 and past the padlock 304. Additionally, the lid hook slots 220 are moved into alignment with the lid hooks 103 so that the lid hooks 103 can pass through the lid slots 220 to open the lid 104. When the handle 222 moves in a second direction, which may be opposite the first direction, the bracket 202 slides into a latched position, causing the padlock 304 to rotate counterclockwise, and the lid hooks 103 engage (do not align) with the lid slots 220, so the lid 104 cannot be opened. The user may then lock the box 100 by inserting the shackle into the padlock body until it clicks.

Figure 9A:
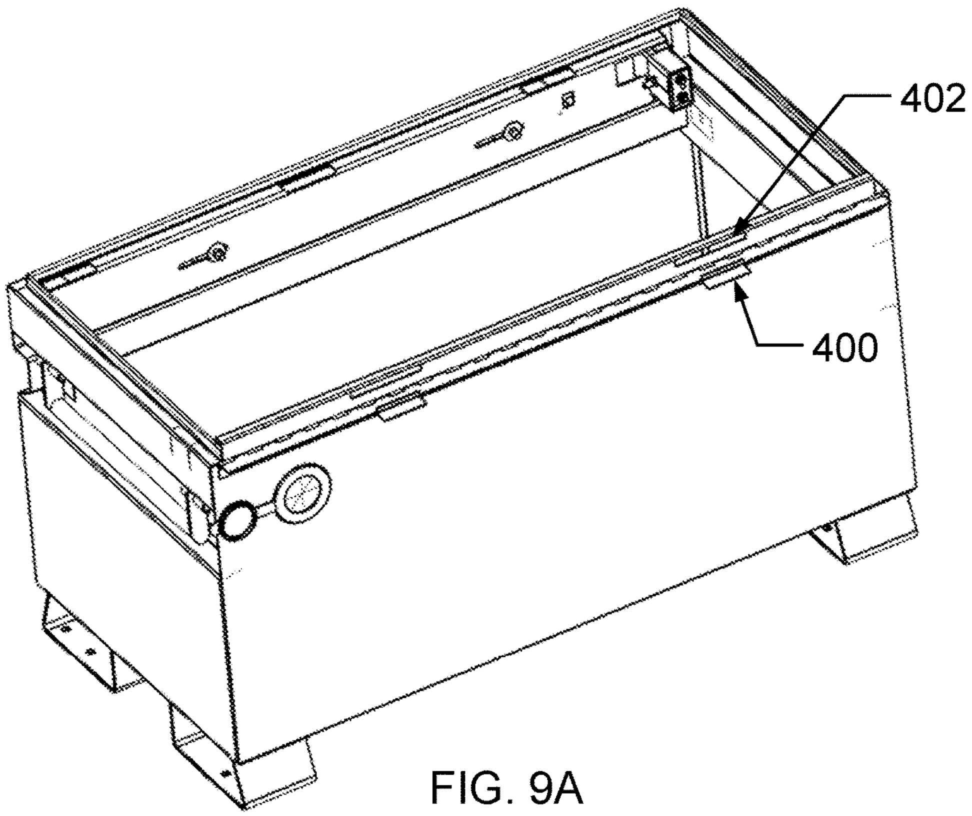
FIG. 9A is a perspective rear view of the storage box shown in FIG. 1 without the lid.
Figure 9B:
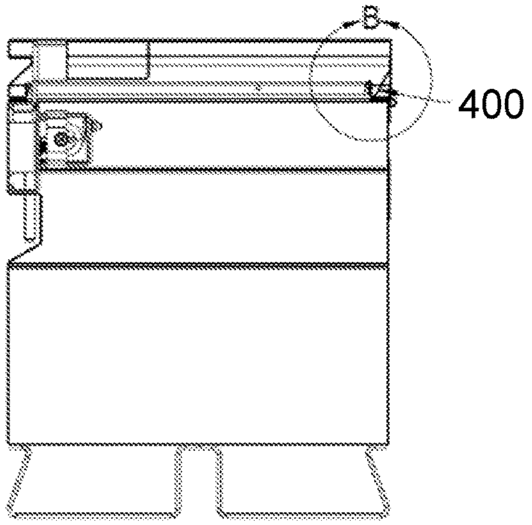
FIG. 9B is a side view of the storage box shown in FIG. 1 in the closed position.
Figure 9C:
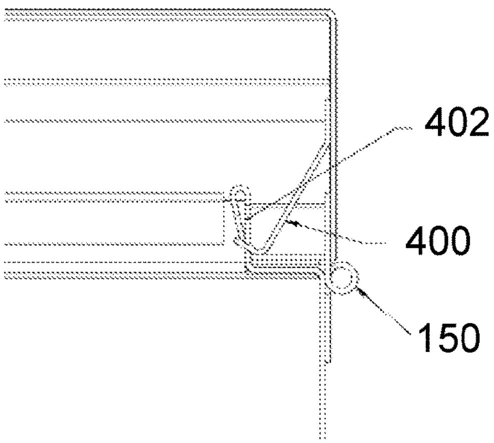
FIG. 9C is a close-up view of the hinge on the lid of the storage box shown in FIG. 1.

Referring again to FIG. 1, in some embodiments, the storage box 100 further includes a plurality of lid tabs 400 positioned at the bottom of lid 104. The lid tabs 400 serve as an additional security feature of the box 100. In some embodiments, the lid tabs 400 are welded to the lid 104. In other embodiments, the lid tabs 400 could be secured to the lid by other similar means. As shown in FIGS. 9A-9C, the lid tabs 400 engage a plurality of corresponding lid tab slots 402 positioned on the rear wall 112 of the box 100 when the lid 104 is closed. Thus, the lid tabs 400 keep the rear of the lid 104 closed even if the hinge 150 is removed or destroyed by attempted forced entry. Although two lid tabs 400 and two lid slots 402 are shown, it should be understood that more or less lid tabs and lid slots could be present. In some embodiments, the lid tabs 400 are each about 3 in. long. The lid tabs 400 may vary in length depending on how many lid tabs are used.

Figure 10:
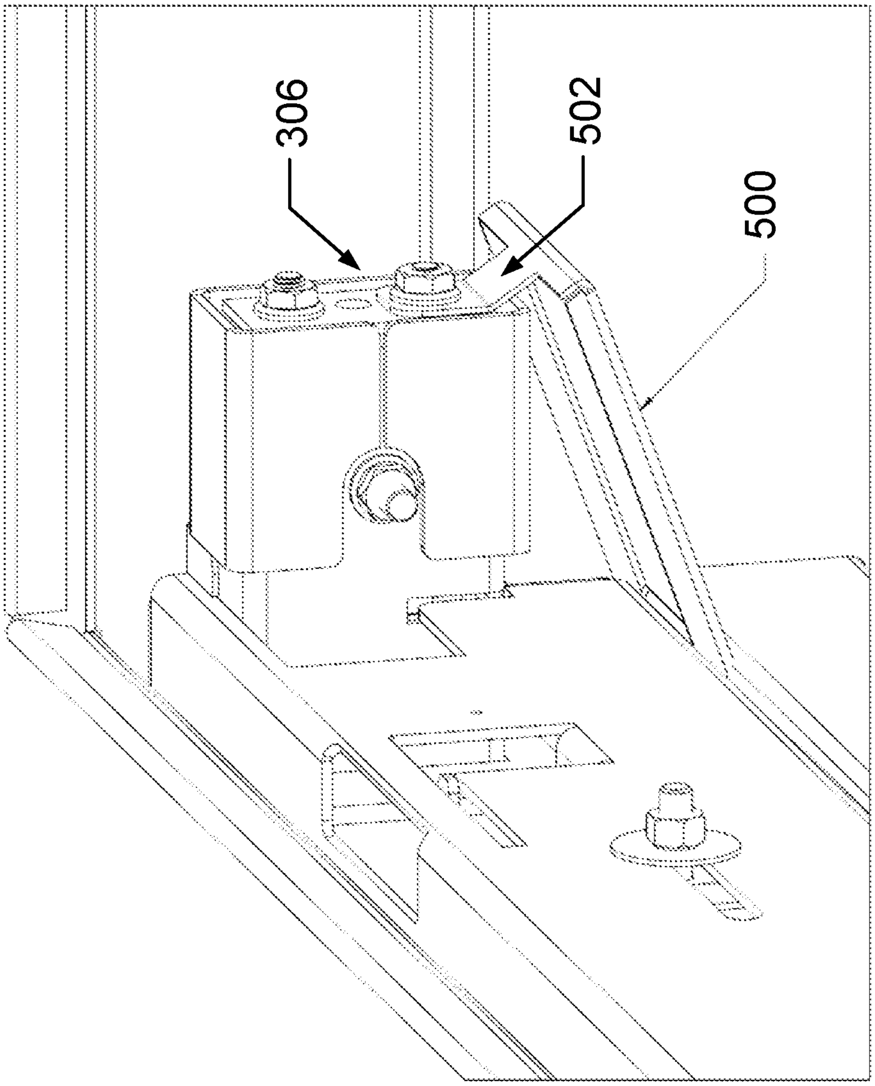
FIG. 10 is a view showing another embodiment of a lock box assembly positioned within the storage box.
Figure 11B:
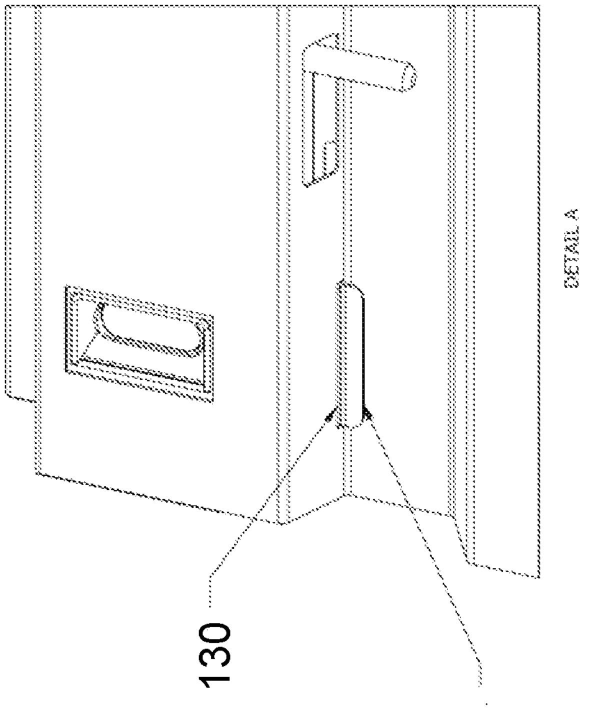
FIGS. 11A and 11B show additional views of the embodiment shown in FIG. 10.
Figure 11A:
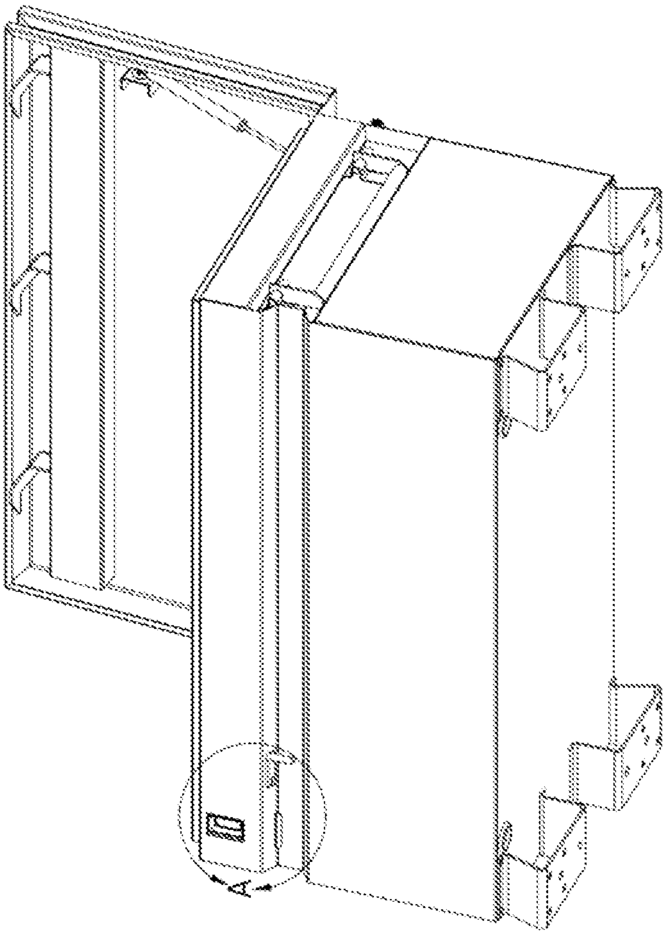

Additionally, in some embodiments, a deflector 500 may be arranged within the storage box 100, as shown in FIGS. 10 and 11. The deflector 500 includes a flange 502 at one end that is connected to the lock housing 306. The opposite end of the deflector 500 extends through a slot 130 in the recessed portion 126 of the front wall 108 of the box 100, near handle 222. The deflector 500 catches any water or other fluid that may enter through opening 128 of the box 100, and deflects it back out of the box through slot 130. Thus, the contents within the box are kept dry in the event of rain, snow, etc.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

The invention claimed is:

1. A latch assembly for use in a storage container having a first body component and a second body component, the latch assembly comprising:

a planar bracket having a body, a first side, and a second side, the planar bracket being releaseably secured to the first or the second body component of the storage container, wherein the first side includes a protruding segment;

at least one slot in the body of the planar bracket, wherein the planar bracket is secured to the storage container via a fastener inserted through the at least one slot; and a handle secured to a support on the planar bracket;

wherein when the handle is slid laterally in a first direction, the planar bracket moves from a latched position to an unlatched position where the protruding segment passes through a lock box assembly, and when the handle is slid laterally in a second direction, the planar bracket moves from the unlatched position to the latched position where the lock box assembly blocks movement of the protruding segment in a locked position of the lock box assembly.

2. The latch assembly of claim 1, wherein the first body component comprises a body and the second body component comprises a lid mounted on the body.

3. The latch assembly of claim 2, wherein the planar bracket further comprises a top ledge and a bottom ledge, wherein the top ledge includes at least one hook slot.

4. The latch assembly of claim 3, wherein the lid includes at least one lid hook that engages the at least one hook slot when the planar bracket is in the latched position.

5. The latch assembly of claim 1, wherein the lock box assembly includes a lock housing surrounding a padlock, and a cover surrounding the lock housing, wherein the lock housing includes a slot configured to receive the protruding segment of the planar bracket in the unlatched position.

6. The latch assembly of claim 1, wherein the planar bracket has a thickness of about 1.5 in. to about 1.8 in.

7. The latch assembly of claim 1, wherein the lock box assembly comprises a shackle block, and wherein the shackle block comprises a first groove on a first side and a second groove on a second, opposite side, the first groove being configured to accommodate a different sized shackle than the second groove.

8. A latch system for use in a storage container having a first body component and a second body component, the latch system comprising:

a latch assembly including:

a planar bracket having a body, a first side, and a second side, the planar bracket being releaseably secured to the first body component or the second body component of the storage container, wherein the first side includes a protruding segment;

at least one slot in the body of the planar bracket, wherein the planar bracket is secured to the storage container via a fastener inserted through the at least one slot; and a handle secured to a support on the planar bracket; and a lock box assembly positioned on the storage container, the lock box assembly including a housing and a lock positioned within the housing;

wherein when the handle is slid laterally in a first direction, the planar bracket moves from a latched position to an unlatched position where the protruding segment passes through the housing, and when the handle is slid laterally in a second direction, the planar bracket moves from the unlatched position to the latched position where the lock blocks movement of the protruding segment through the housing in a locked position of the lock box assembly.

9. The latch system, of claim 8, wherein the lock is a padlock having a shackle.

10. The latch system of claim 9, wherein the lock box assembly further comprises at least one shackle block positioned within the housing, the at least one shackle block being configured to accommodate the shackle of the padlock.

11. The latch system of claim 10, wherein the at least one shackle block comprises a first groove on a first side and a second groove on a second, opposite side, the first groove being configured to accommodate a different sized shackle than the second groove.

12. The latch system of claim 8, wherein the housing includes a slot configured to receive the protruding segment of the planar bracket in the unlatched position.

13. The latch system of claim 8, wherein the lock box assembly further comprises a cover surrounding at least a part of the housing, wherein the cover is adjustable.

14. A storage container having a latch system, the storage container comprising:

a body and a lid mounted on the body by a hinge;

a latch assembly releasably secured to an interior of the body, the latch assembly including:

a planar bracket having a body, a first side, and a second side, wherein the first side includes a protruding segment;

at least one slot in the body of the planar bracket, wherein the planar bracket is secured to the interior of the body of the storage container via a fastener inserted through the at least one slot; and a handle secured to a support on the planar bracket; and a lock box assembly mounted to the interior of body of the storage container, the lock box assembly including a housing and a lock positioned within the housing;

wherein when the handle is slid laterally in a first direction, the planar bracket moves from a latched position to an unlatched position where the protruding segment passes through the housing, and when the handle is slid laterally in a second direction, the planar bracket moves from the unlatched position to the latched position where the lock blocks movement of the protruding segment through the housing in a locked position of the lock box assembly.

15. The storage container of claim 14, wherein the planar bracket further comprises a top ledge including at least one lid hook slot.

16. The storage container of claim 15, wherein the lid includes at least one lid hook that engages the at least one lid hook slot when the planar bracket is in the latched position.

17. The storage container of claim 14, further comprising at least one lid tab positioned on a bottom of the lid, the at least one lid tab configured to prevent the lid from opening if the hinge is removed or destroyed.

18. The storage container of claim 17, wherein the at least one lid tab engages at least one lid slot positioned on a rear wall of the body of the storage container when the lid is in a closed position.

19. The storage container of claim 14, wherein the lock is a padlock having a shackle, and wherein the lock box assembly further comprises at least one shackle block positioned within the housing, the at least one shackle block being configured to accommodate the shackle of the padlock.

20. The storage container of claim 14, further comprising a deflector secured to the housing of the lock box assembly, the deflector being configured to deflect fluid near the lock box assembly to an outside of the storage container.

* * * * *